US009206905B2

(12) United States Patent
Franceschini

(10) Patent No.: US 9,206,905 B2
(45) Date of Patent: Dec. 8, 2015

(54) LEAF SEAL

(71) Applicant: ROLLS-ROYCE PLC, London (GB)

(72) Inventor: Gervas Franceschini, Derby (GB)

(73) Assignee: ROLLS-ROYCE PLC, London (GB)

(*) Notice: Subject to any disclaimer, the term of this patent is extended or adjusted under 35 U.S.C. 154(b) by 249 days.

(21) Appl. No.: 14/317,905

(22) Filed: Jun. 27, 2014

(65) Prior Publication Data
US 2015/0323077 A1 Nov. 12, 2015

(30) Foreign Application Priority Data

Jun. 28, 2013 (GB) .................................. 1311607.4

(51) Int. Cl.
F16J 15/447 (2006.01)
F16J 15/32 (2006.01)
F01D 11/00 (2006.01)

(52) U.S. Cl.
CPC .......... *F16J 15/3292* (2013.01); *F01D 11/001* (2013.01); *F05D 2220/32* (2013.01); *F05D 2240/57* (2013.01)

(58) Field of Classification Search
CPC ........................... F16J 15/3284; F16J 15/3292
See application file for complete search history.

(56) References Cited

U.S. PATENT DOCUMENTS

| 5,183,197 | A | 2/1993 | Howe |
| 5,201,530 | A | 4/1993 | Kelch et al. |
| 5,335,920 | A | 8/1994 | Tseng et al. |
| 5,480,165 | A | 1/1996 | Flower |
| 6,120,622 | A | 9/2000 | Mayr et al. |
| 6,267,381 | B1 * | 7/2001 | Wright ............... F16J 15/3292 277/355 |
| 6,343,792 | B1 * | 2/2002 | Shinohara et al. .... F01D 11/001 277/345 |
| 7,487,588 | B2 | 2/2009 | Hogg et al. |
| 7,828,297 | B2 | 11/2010 | Hoebel et al. |
| 8,025,296 | B2 | 9/2011 | Uehara et al. |

(Continued)

FOREIGN PATENT DOCUMENTS

DE 699 34 152 T2 3/2007
EP 0902221 A2 3/1999

(Continued)

OTHER PUBLICATIONS

Nov. 28, 2014 Search Report issued in European Application No. 14 17 4647.

(Continued)

*Primary Examiner* — Gilbert Lee
(74) *Attorney, Agent, or Firm* — Oliff PLC

(57) ABSTRACT

A leaf seal for effecting a seal between coaxials and relatively rotating components. The seal has annular pack of stacked leaves, the pack mountable to first one of components at leaves root portions and extending towards other component end edges of leaves presented for air-riding interaction with other component during relative rotation between components. In use, pressure drop is maintained axially across the pack, which includes first set of leaves arranged around the pack, each to present an end edge at least part in relationship with other component. The pack includes second set of leaves circumferentially interspersed throughout the first set. The first and second sets, leaves help define, around the pack, circumferential spaces between end edges of first set's successive leaves, the spaces create circumferential variation in pressure around the pack contributing to the generation of hydrodynamic lift between pack and other component during relative rotation between components.

14 Claims, 9 Drawing Sheets

(56) References Cited

U.S. PATENT DOCUMENTS

| | | | |
|---|---|---|---|
| 8,152,462 B1 | 4/2012 | Williams | |
| 8,231,340 B2 | 7/2012 | Howes | |
| 8,393,859 B1* | 3/2013 | Dillon | F04D 29/102 277/355 |
| 8,585,058 B2 | 11/2013 | Rhodes et al. | |
| 8,608,174 B2 | 12/2013 | Kono | |
| 2002/0000694 A1 | 1/2002 | Justak | |
| 2002/0105146 A1 | 8/2002 | Uehara et al. | |
| 2007/0018408 A1* | 1/2007 | Kono | F16J 15/3292 277/355 |
| 2007/0120326 A1 | 5/2007 | Rhodes et al. | |
| 2009/0081028 A1 | 3/2009 | Morgan et al. | |
| 2009/0322038 A1 | 12/2009 | Wright | |
| 2011/0135453 A1 | 6/2011 | Howes | |
| 2011/0227289 A1 | 9/2011 | Stefan | |
| 2012/0093633 A1 | 4/2012 | Kasibhotla et al. | |
| 2012/0315138 A1* | 12/2012 | Rao | F10D 11/00 415/231 |
| 2015/0001808 A1* | 1/2015 | Franceschini | F01D 11/00 277/355 |

FOREIGN PATENT DOCUMENTS

| | | |
|---|---|---|
| EP | 0933567 A2 | 8/1999 |
| EP | 1 013 975 | 6/2000 |
| EP | 1 482 220 A1 | 12/2004 |
| EP | 2 532 838 A1 | 12/2012 |
| EP | 2 592 310 A1 | 5/2013 |
| FR | 2 650 048 | 1/1991 |
| GB | 2021209 A | 11/1979 |

OTHER PUBLICATIONS

Apr. 15, 2015 Search Report issued in European Patent Application No. 14 17 4644.

Apr. 15, 2015 Search Report issued in European Patent Application No. 14 17 4645.

Nov. 19, 2013 British Search Report issued in British Application No. 1311610.8.

Nov. 11, 2013 British Search Report issued in British Application No. 1311607.4.

U.S. Appl. No. 14/317,651, filed Jun. 27, 2014 in the name of Franceschini et al.

Sep. 2, 2015 Office Action issued in U.S. Appl. No. 14/317,651.

* cited by examiner

LEAF SEAL

FIELD OF THE INVENTION

The present invention relates to a leaf seal.

BACKGROUND OF THE INVENTION

Leaf seals may be used to form a seal between two relatively rotating components in order to maintain a relatively high pressure on one side of the seal and a relatively low pressure on the other. A leaf seal is arranged with a large number of typically rectangular leaves which are held at a defined angle (the "lay angle") to the radial all the way round the seal circumference. The leaves give the seal a low stiffness, and the leaves are packed together such that the total leakage through the seal is reduced. Nonetheless, interleaf gaps do provide the seal with a porous aerodynamic working section. Such seals may be used, for example, in gas turbine engines.

FIG. 1 shows schematically a cut-away perspective view of a portion of a leaf seal 31 comprising a pack of leaves 32. FIG. 2 shows (a) a view along the axial direction of an arc segment of the pack to better show some of the leaves 32 edge-on, and (b) a plan view of a single leaf 32.

The leaves 32 each have a root portion 40 and a working portion 41, and have a width w in the axial direction and a thickness t. The leaves alternate with spacer elements 33 at their root portions 40, and are secured thereat to a backing ring 34 of a housing, which typically also comprises front 35a (high pressure side) and rear (low pressure side) 35b rigid cover plates. The working portions 41 of the leaves 32 present end edges 36 towards a surface 37 of a rotating component (shaft) generally rotating in the direction depicted by arrowhead 38. The leaves 32, and in particular the end edges 36 of the leaves 32, act against the surface 37 in order to create a seal across the assembly 31. Each leaf 32 is sufficiently compliant in order to adjust with rotation of the surface 37, so that a good sealing effect is created. The spacers 33 ensure that flexibility is available to appropriately present the leaves 32 towards the surface 37 which, as illustrated, is generally with an inclined angle between them. The spacers 33 also help to form interleaf gaps 39 between adjacent working portions 41 of the leaves 32. A leakage flow through these gaps 39 is induced by the pressure differential across the seal.

Leaf seals of an air-riding configuration are configured such that the end edges 36 of the leaves adjacent the rotating component are presented with a small air gap therebetween such that the leaves ride on the air leakage through that gap to inhibit premature contact wear of the leaf seal elements against the surface of the rotating component. It will be understood that the air gap should be as narrow as possible such that air leakage is reduced to the minimal level possible whilst creating the air-riding effect, so as to limit actual leakage across the seal. However, it has been found that it can be difficult to generate sufficient hydrodynamic lift between the leaf pack and the rotating component to provide a satisfactory air-riding cushion between the two.

It is normal for all of the leaves 32 in the pack to have an identical configuration. As illustrated most clearly in FIG. 1, the resulting leaf pack thus defines an inner bore around the rotating component which is substantially parallel to the outer surface 37 of the rotating component. Such an arrangement can thus be considered to behave rather like a parallel bearing when in use, in the sense that it provides limited potential for the generation of hydrodynamic lift due to the fact that it provides two substantially parallel and relatively rotating surfaces. The result is a leaf seal with poor hydrodynamic lift which is thus prone to wear at the tips of the leaves defining the inner bore around the rotating component and/or on the surface of the rotating component itself. This limits the useful life of the leaf seal.

It is a preferred object of the present invention to provide an improved leaf seal.

SUMMARY OF THE INVENTION

In a first aspect, the present invention provides a leaf seal for effecting a seal between two coaxial and relatively rotating components, the seal having an annular pack of stacked leaves, the pack being mountable to a first one of the components at root portions of the leaves and extending towards the other component such that end edges of the leaves are presented for air-riding interaction with the other component during relative rotation between the components and, in use, a pressure drop is maintained axially across the pack; wherein the pack comprises a first set of leaves arranged around the pack, each of which is configured to present an end edge at least part of which is in intimate relationship with the other component; and a second set of leaves circumferentially interspersed throughout the first set, the leaves of the first and second sets cooperating to define, around the pack, a plurality of circumferential spaces between the end edges of successive leaves of the first set, said spaces being configured to create a circumferential variation in pressure around the pack which contributes to the generation of hydrodynamic lift between the pack and the other component during relative rotation between the components. Each leaf of said second set defines a radial gap between at least a region of its end edge and the other component. In such an arrangement, the radial gaps define a radial dimension of said circumferential spaces.

As will be appreciated, the leaf seal is preferably provided in the form of an air-riding leaf seal.

In a second aspect, the present invention provides a gas turbine engine, such as an aero gas turbine engine, having one or more leaf seals according to the first aspect.

Optional features of the invention are set out below. These are applicable singly or in any combination with any aspect of the invention.

The pack has a high pressure side and a low pressure side across which said pressure drop is maintained in use, and it is proposed that at least some of the radial gaps will be provided such that they are open to the high pressure side. At least some of the radial gaps can also be open to the low pressure side of the pack. Alternatively, the some of the radial gaps can be configured such that they are only open to the low pressure side.

Optionally, the leaves of said second set are shorter, as measured between their root portions and their end edges, than the leaves of the first set. The second set may be shorter than the first set by between 0.1 mm and 2 mm. Preferably, the difference in length is at least 0.5 mm. These differences may be working differences after a period of wear has been taken into account. For example, after the seals have been run in.

In some embodiments of the invention, at least some of the leaves of the second set have an end edge region presenting a stepped axial profile towards the other component.

At least some of the leaves of the second set may have an end edge region which presents a sloped axial profile towards the other component. Alternatively, or additionally, at least some of the leaves of the second set have an end edge region which presents at least one chamfered corner towards the other component.

The pack of leaves can include leaves of different thicknesses to one another.

In a preferred arrangement, the leaves of the first and second sets are provided in an alternating fashion around the pack such that each leaf of the second set is located between two leaves of the first set. However, other leaf distributions are possible. For example the first set of leaves can include more leaves than the second set, with the leaves of the second set being arranged between successive groups of first set leaves around the pack.

In other arrangements, the second set of leaves may include more leaves than the first set, in which case the leaves of the first set can be arranged between successive groups of second set leaves around the pack.

Other variants are also envisaged in which said second set of leaves includes at least two different types of leaves, the leaves of each type having a different end edge configuration to one another.

The leaf seal can be used, for example, in gas and steam turbines, and jet engines. However, it may also be used in other applications, e.g. where sealing between a high and low pressure region is required along a shaft.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 3:
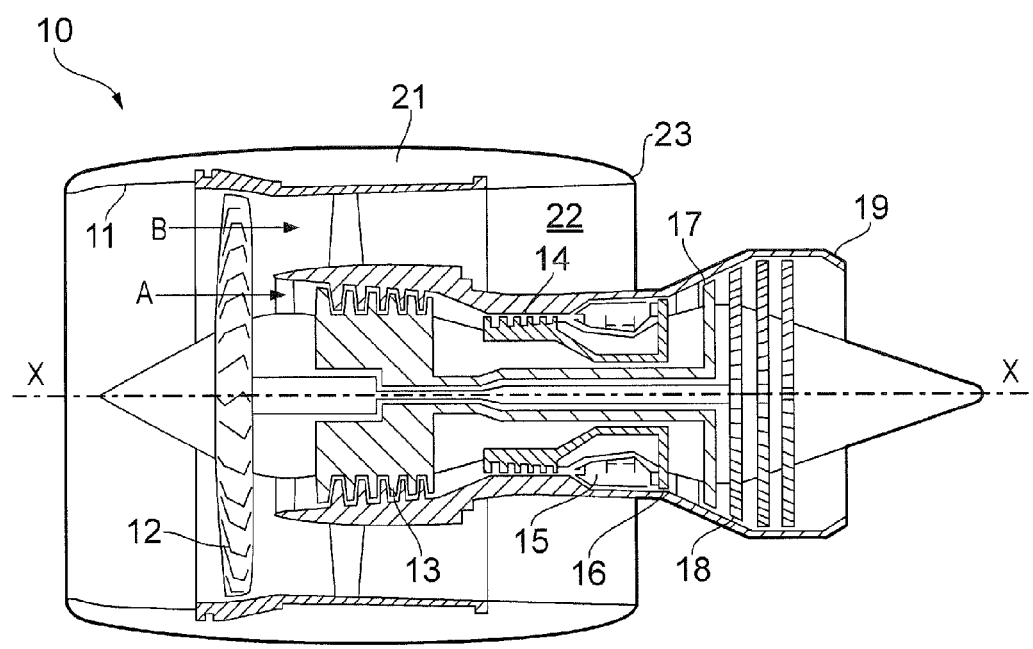
FIG. 3 shows schematically a longitudinal section through a gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The engine has one or more leaf seals installed, for example, between an interconnecting shaft and a casing for the shaft.

Figure 1:
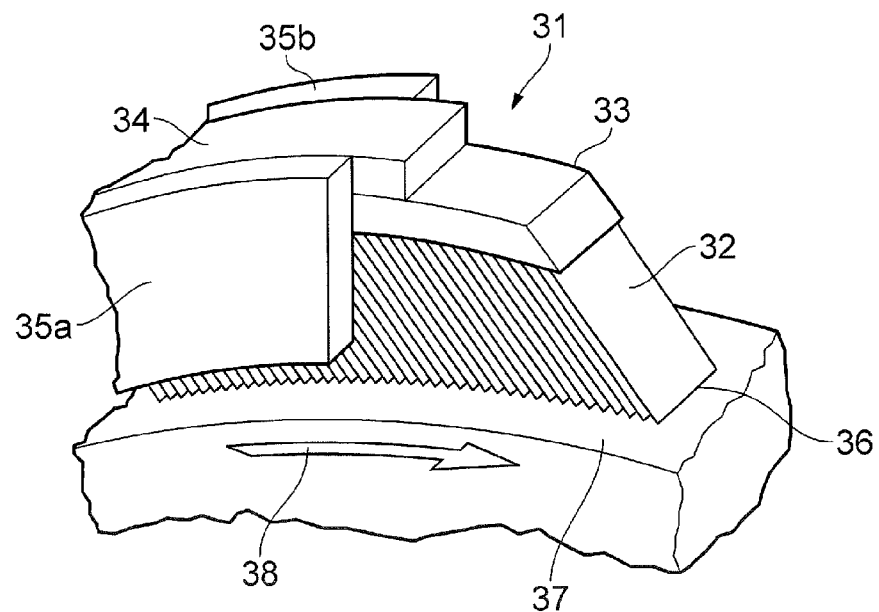
FIG. 1 shows schematically a cut-away perspective view of a portion of a leaf seal.
Figure 2:
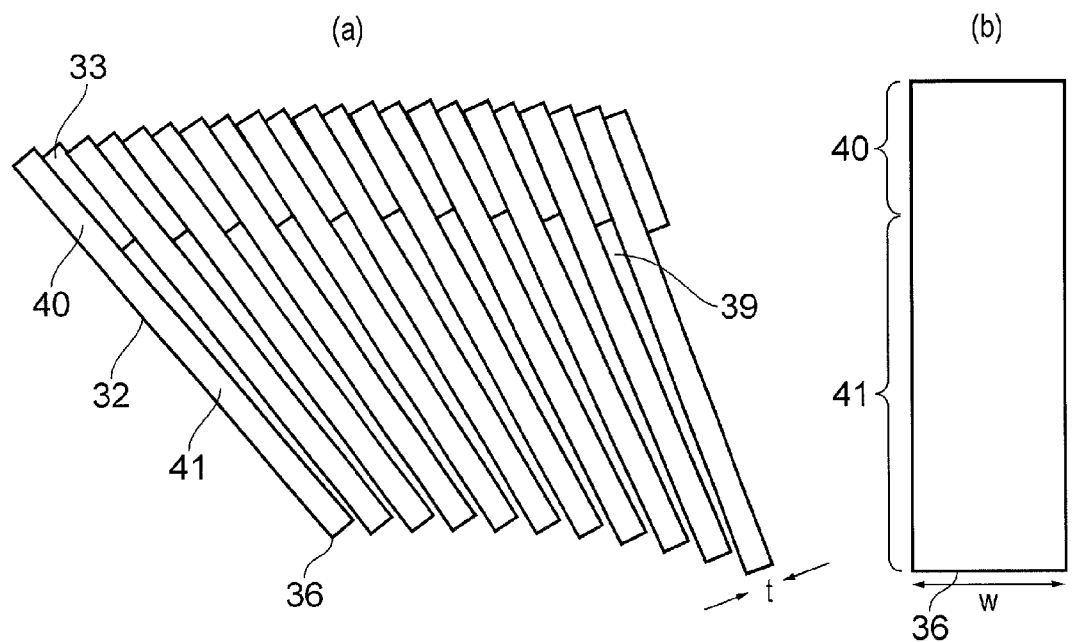
FIG. 2 shows (a) a view along the axial direction of an arc segment of the pack of leaves of the seal of FIG. 1, and (b) a plan view of a single leaf of the seal of FIG. 1.
Figure 4:
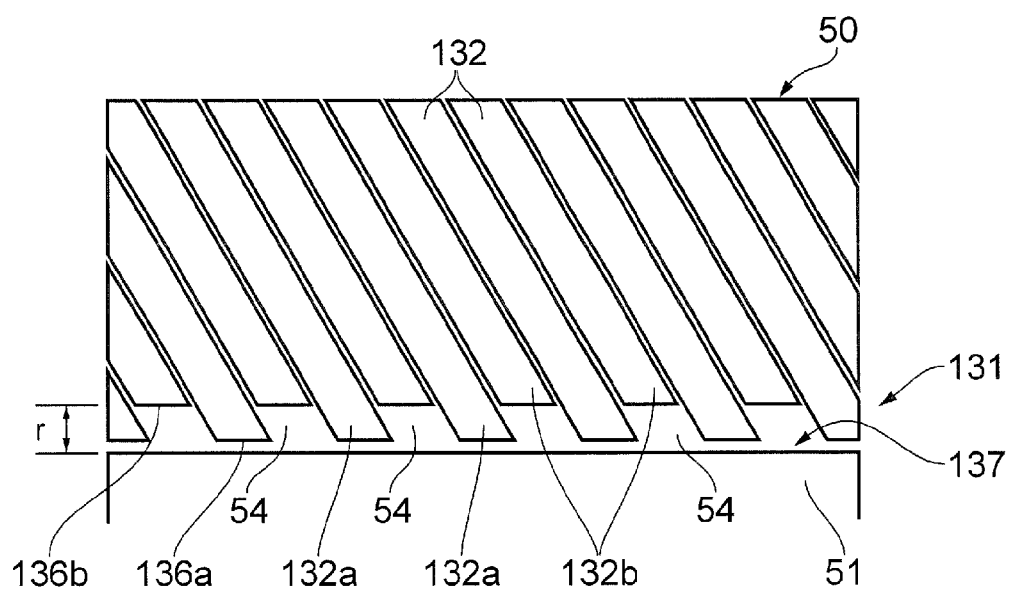
FIG. 4 is a schematic drawing illustrating part of a leaf seal in accordance with the invention, showing a view from an upstream side of the seal and along the axial direction of a segment of a pack of leaves.
Figure 5:
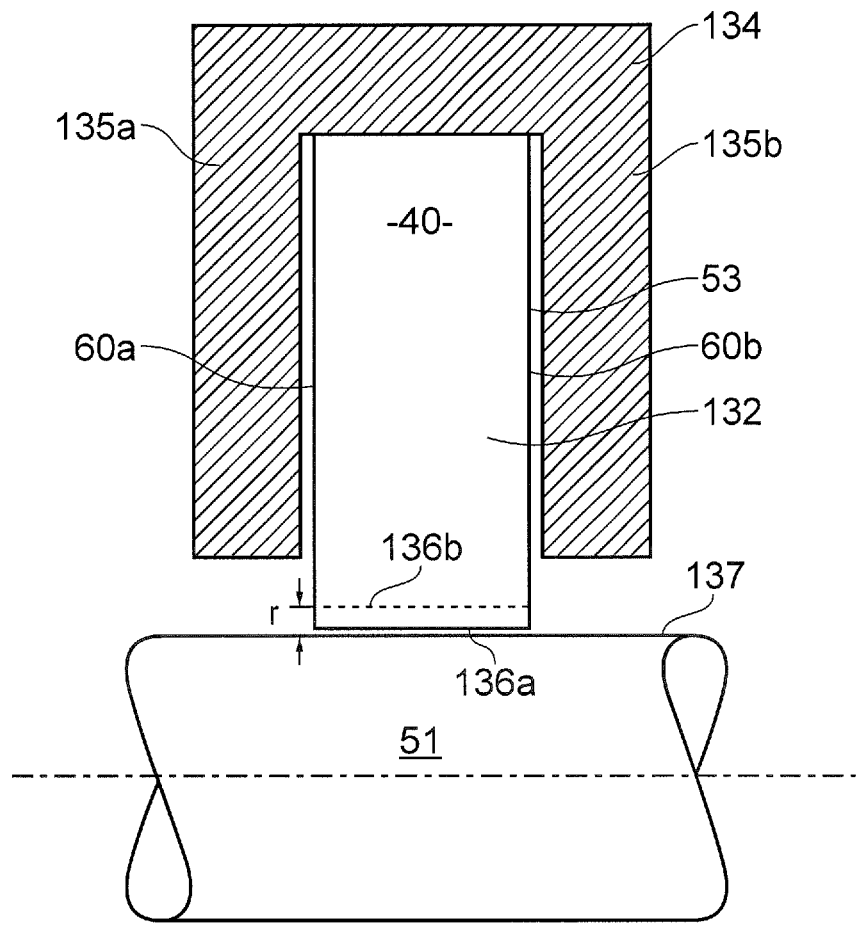
FIG. 5 is a schematic radial cross-sectional view of the leaf seal of FIG. 4.

FIG. 4 shows, schematically, an axial view of a sector of a pack 50 of individual leaves 132 used in an air-riding leaf seal 131 of the present invention. The pack of leaves 132 is preferably arranged and mounted relative to the surface 137 of a rotor 51 in a generally conventional manner, similar in several respects to the conventional arrangement illustrated in FIGS. 1 and 2. It is to be appreciated, however, that for the sake of simplicity the curvature of the pack 50 and the rotor 51 (for example a shaft) is not shown in FIG. 4. FIG. 5 shows a radial cross sectional view through the pack of leaves 132.

The leaf seal 131 is thus shown to have an annular pack 50 of approximately rectangular leaves 132 terminating at radially inward end edges 136 which are presented for air-riding interaction with the rotor 51 in a manner which will be described in more detail below. The leaves are held at an inclined angle to the radial. Interleaf gaps are formed between the leaves 132, giving a porous aerodynamic working section and sufficient compliance to adjust to the rotor. Nonetheless, the leaves are packed sufficiently tightly together so that the total leakage through the seal is low.

As illustrated most clearly in FIG. 5, the root portions 40 of the leaves are held in a housing 134 which includes an upstream (high pressure) cover plate 135a and a downstream (low pressure) cover plate 135b which each cover a portion of the radial extent of the leaf pack in a generally conventional manner. Each leaf 132 has an upstream (high pressure) side edge 60a and a downstream (low pressure) side edge 60b.

As illustrated most clearly in FIG. 4, the pack 50 of leaves includes leaves of two distinct configurations. More particularly, the pack 50 includes a first set of relatively long leaves 132a, and a second set of relatively short leaves 132b, as measured between their root portions 40 and their end edges 136. In this embodiment, the long leaves 132a of the first set are all identical to one another, and the short leaves 132b of the second set are also all identical to one another.

The relatively long leaves 132a of the first set are arranged circumferentially around the annulus of the pack 50, and are each configured to present their respective end edges 136a into a very close, intimate relationship with the surface 137 of the rotor 51. It is envisaged that when the rotor is stationary and thus not rotating relative to the pack 50, or when the rotor is moving only at low speed relative to the pack 50, the end edges 136a of the relatively long leaves may lightly touch the surface 137 of the rotor for wiping contact therewith during low-speed rotation.

The relatively short leaves 132b of the second set are circumferentially interspersed throughout the relatively long leaves 132a of the first set. In the particular arrangement illustrated in FIG. 4, the short leaves 132b are distributed amongst the long leaves 132a such that the long and short leaves are provided in an alternating fashion around the pack 50. As will thus be noted, in this arrangement each short leaf 132b of the second set is located between a pair of long leaves 132a of the first set.

Due to their relatively short length, the leaves 132b of the second set define end edges 136b which are spaced radially from the surface 137 of the rotor 51 by a distance r. Radial gaps 54 are thus defined between the end edges 136b of the short leaves 132b and the rotor 51, the gaps 54 thus forming respective circumferential spaces between the end edges 136a of successive long leaves 132a of the first set. As will be noted from FIG. 5 in particular, the radial gaps, and hence the circumferential spaces they define, are open to both the upstream (high pressure) side and the downstream (low pressure) side of the leaf pack 50.

As will thus be appreciated, a plurality of said circumferential spaces 54 are defined between successive long leaves 132a around the entire extent of the pack. During rotational operation of the leaf seal arrangement, the circumferential spaces 54 function in the manner of Rayleigh steps to generate lift forces L acting between the end of each of the longer leaves 132a and the rotor surface 137, and also drag forces D. The spaces 54 provide these lift forces via entrainment of the flow in the boundary layer around the rotating rotor, which thus creates a circumferential variation in pressure around the leaf pack. Because the leaves 132 are packed tightly against one another (either with very small gaps between their end regions, or actually touching at their end regions), the lift generated by the hydrodynamic pressure variation caused by the spaces 54 is transferred to the neighbouring leaves by mechanical deflection and/or mechanical loading, such that the entire leaf pack experiences an increase in hydrodynamic lift around its annular extent. An effective air riding cushion is thus created between the leaf pack 50 and the rotating surface 137 of the rotor shaft 51.

Turning now to consider FIGS. 7 and 8, an alternative leaf seal arrangement falling within the scope of the present invention will now be described. This arrangement represents a modification of the arrangement of FIGS. 4 to 6.

Figure 6:
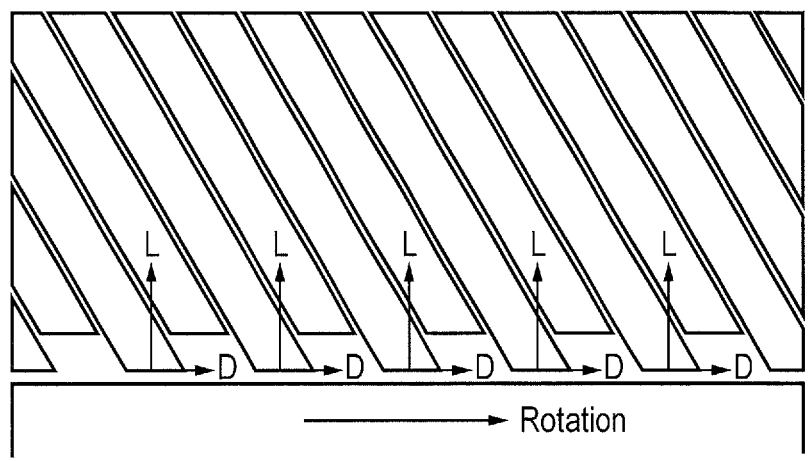
FIG. 6 is a view corresponding generally to that of FIG. 4, showing hydrodynamic lift and drag forces.
Figure 7:
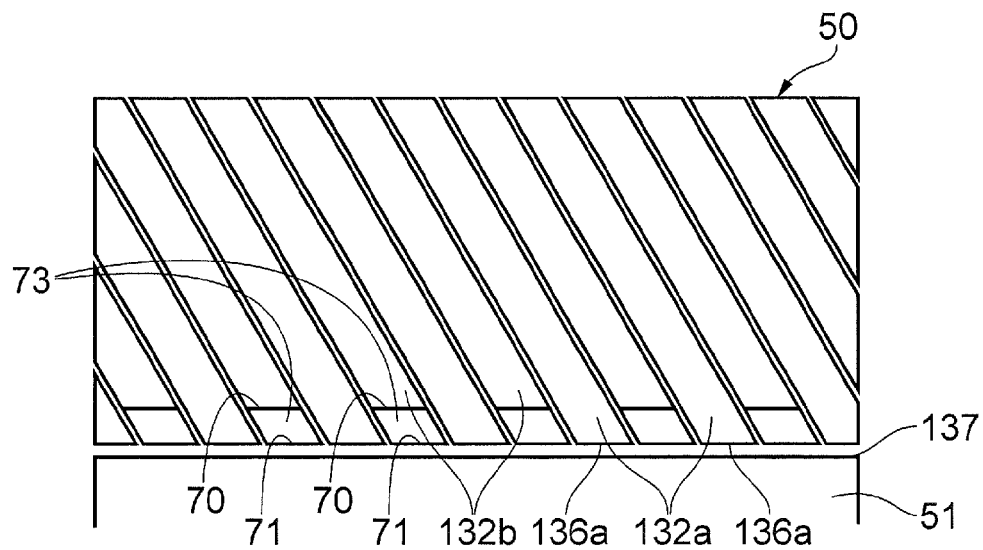
FIG. 7 is an axial view similar to that of FIG. 4, but which shows a leaf seal in accordance with another embodiment.
Figure 8:
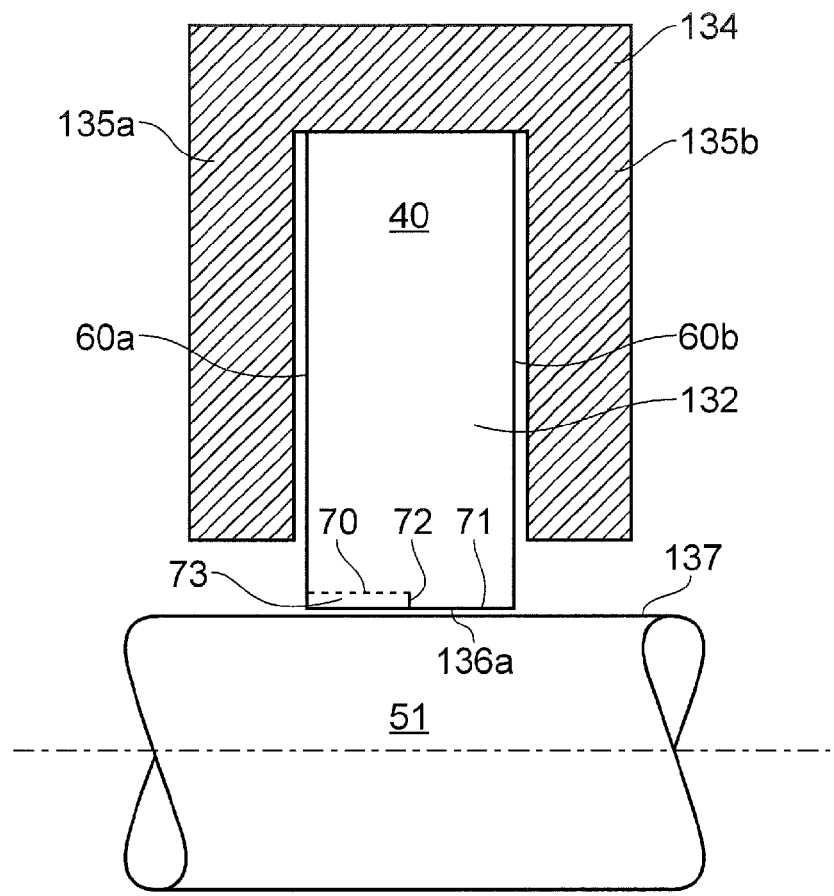
FIG. 8 is a schematic radial cross-sectional view of the leaf seal of FIG. 7.

In the modified arrangement of FIGS. 7 and 8, the pack of leaves 50 again includes leaves of two distinct configurations. More particularly, the pack 50 includes a first set of leaves 132a and a second set of leaves 132b. The leaves 132a of the first set are generally identical to the leaves 132a of the arrangement illustrated in FIGS. 4 to 6, and are hence generally rectangular in form and arranged circumferentially around the annulus of the pack 50. The leaves 132a of the first set are thus configured to present respective linear end edges 136a into a very close, intimate relationship with the surface 137 of the rotor 51. It is envisaged that when the rotor is stationary and thus not rotating relative to the pack 50, or when the rotor is moving only at low speed relative to the pack 50, the end edges 136a of the first set leaves may lightly touch the surface 137 of the rotor for wiping contact therewith during low-speed rotation.

The leaves 132b of the second set are again circumferentially interspersed throughout the leaves 132a of the first set. In the particular arrangement illustrated in FIG. 7, the leaves 132b of the second set are distributed amongst the leaves 132a of the first set such that the two types of leaves are provided in an alternating fashion around the pack 50. As will thus be noted, in this arrangement each leaf 132b of the second set is located between a pair of leaves 132a of the first set. This is a similar distribution to the embodiment illustrated in FIGS. 4 to 6.

The leaves 132b of the second set are configured to be generally identical to one another, and such that each has an end edge region with a stepped axial profile which is presented towards the surface 137 of the rotor 51. More particularly, it is to be noted that the leaves 132b of the second set each have an end region missing on their upstream sides adjacent their upstream (high pressure) side edges 60a. A stepped end edge 136b is thus created which comprises an upstream region 70 and a downstream region 71, the two regions being separated by a generally radially extending step 72.

The downstream region 71 of the end edge 136b of each second set leaf 132b is presented into a very close, intimate relationship with the surface 137 of the rotor 51 in a similar manner to the end edges 136a of the first set leaves 132a. However, the upstream region 70 of the end edge of each second set leaf 132b is spaced radially from the surface 137 of the rotor 51 by a distance r. Upstream radial gaps 73 are thus defined between the upstream end edge regions 71 of the stepped leaves 132b and the rotor 51, the gaps 73 thus forming respective circumferential spaces between the upstream regions of the end edges 136a of successive leaves 132a of the first set. As will be noted from FIG. 8 in particular, the upstream radial gaps, and hence the circumferential spaces they define, are open only to the upstream (high pressure) side of the leaf pack 50. This is in contrast to the arrangement of FIGS. 4 to 6, in which the radial gaps 54 are open to both the upstream and downstream sides of the pack 50.

The modified arrangement of FIGS. 7 and 8 operates in a similar manner to the arrangement of FIGS. 4 to 6, although it is to be appreciated that the hydrodynamic lift forces which are generated around the pack 50 are concentrated in the upstream region of the pack closest to the high pressure side of the leaf seal arrangement. More particularly, during rotational operation of the leaf seal arrangement, the upstream circumferential spaces 73 function in the manner of Rayleigh steps to generate lift forces L and also drag forces D in the upstream regions of the leaf ends. The spaces 73 provide these lift forces via entrainment of the flow in the boundary layer around the rotating rotor, which thus creates a circumferential variation in pressure around the leaf pack. Because the leaves 132 are packed tightly against one another (either with very small gaps between their end regions, or actually touching at their end regions), the lift generated by the hydrodynamic pressure variation caused by the spaces 73 is transferred to the neighbouring leaves by mechanical deflection and/or mechanical loading, such that the entire leaf pack experiences an increase in hydrodynamic lift around its annular extent. An effective air-riding cushion is thus created between the leaf pack 50 and the rotating surface 137 of the rotor shaft 51.

Turning now to consider FIGS. 9 and 10, another alternative leaf seal arrangement falling within the scope of the present invention will now be described. This arrangement represents a further modification of the arrangement of FIGS. 7 and 8.

Figure 9:
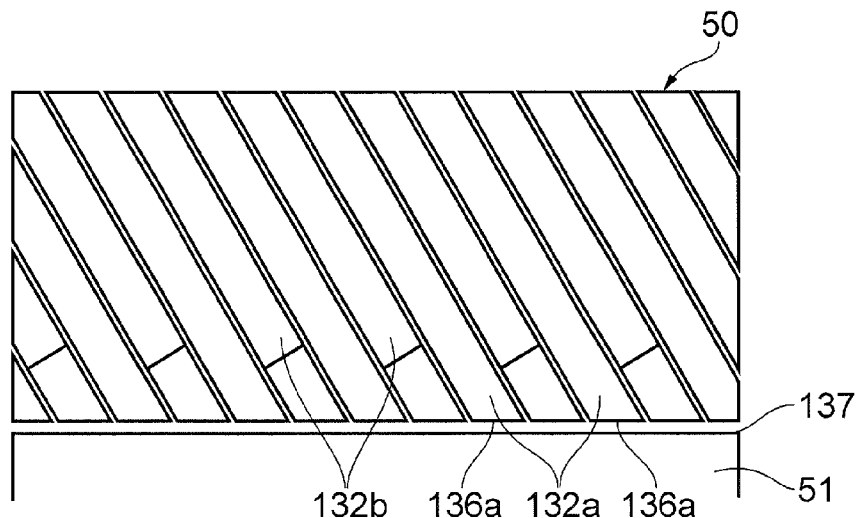
FIG. 9 is a schematic axial view, from the upstream side of the seal, showing part of a leaf seal in accordance with a third embodiment.
Figure 10:
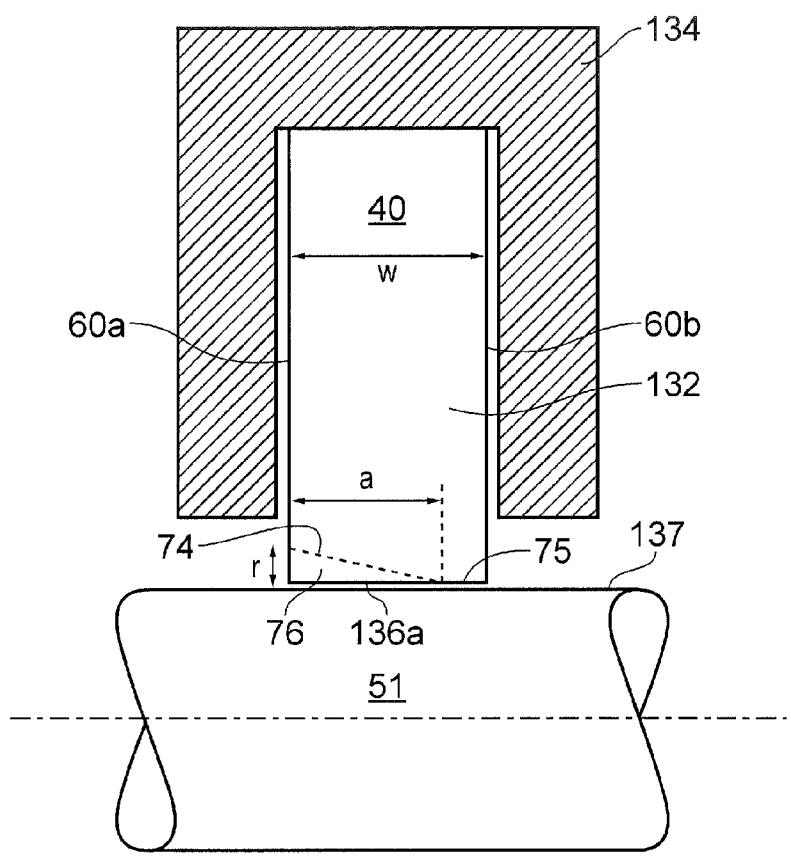
FIG. 10 is a schematic radial cross-sectional view of the leaf seal of FIG. 9.

In the modified arrangement of FIGS. 9 and 10, the pack of leaves 50 again includes leaves of two distinct configurations. More particularly, the pack 50 includes a first set of leaves 132a and a second set of leaves 132b. The leaves 132a of the first set are generally identical to the leaves 132a of the arrangements illustrated in FIGS. 4 to 6 and FIGS. 7 and 8, and are hence generally rectangular in form and arranged circumferentially around the annulus of the pack 50. The leaves 132a of the first set are thus configured to present respective linear end edges 136a into a very close, intimate relationship with the surface 137 of the rotor 51. It is envisaged that when the rotor is stationary and thus not rotating relative to the pack 50, or when the rotor is moving only at low speed relative to the pack 50, the end edges 136a of the first set leaves may lightly touch the surface 137 of the rotor for wiping contact therewith during low-speed rotation.

The leaves 132b of the second set are again circumferentially interspersed throughout the leaves 132a of the first set. In the particular arrangement illustrated in FIG. 9, the leaves 132b of the second set are distributed amongst the leaves 132a of the first set such that the two types of leaves are again provided in an alternating fashion around the pack 50. As will thus be noted, in this arrangement each leaf 132b of the second set is located between a pair of leaves 132a of the first set. This is a similar distribution to the two embodiments described previously.

The leaves 132b of the second set are configured to be generally identical to one another, and such that each has an end edge region with a partially sloped axial profile which is presented towards the surface 137 of the rotor 51. More particularly, it is to be noted that the leaves 132b of the second set each have a triangular end region missing from their upstream corners adjacent their upstream (high pressure) side edges 60a. A partially tapered end edge 136b is thus created which comprises an upstream sloped region 74 and a downstream region 75 which is generally parallel to the surface 137 of the rotor 51.

The downstream region 75 of the end edge 136b of each second set leaf 132b is linear and presented into a very close, intimate relationship with the surface 137 of the rotor 51 in a similar manner to the end edges 136a of the first set leaves 132a. However, the upstream sloped region 74 of the end edge of each second set leaf 132b is spaced radially from the surface 137 of the rotor 51 by a maximum distance r adjacent the upstream side edge 60a of the leaf and which narrows in a linear manner towards the surface 137 in a downstream direction. Upstream radial gaps 76 having a triangular radial cross section are thus defined between the upstream sloped edge regions 74 of the and the rotor 51, the gaps 76 thus forming respective circumferential spaces between the upstream regions of the end edges 136a of successive leaves 132a of the first set. As will be noted from FIG. 10 in particular, the upstream radial gaps, and hence the circumferential spaces they define, are open only to the upstream (high pressure) side of the leaf pack 50. This is similar to the arrangement of FIGS. 7 and 8 but in contrast to the arrangement of FIGS. 4 to 6.

The modified arrangement of FIGS. 9 and 10 operates in a similar manner to the arrangement of FIGS. 7 and 8, with the hydrodynamic lift forces which are generated around the pack 50 being concentrated in the upstream region of the pack closest to the high pressure side of the leaf seal arrangement.

The upstream sloped region 74 of the second set leaves 132b extends over an axial distance a which is preferably between 0.1w and 0.9w, where w is the axial width of each leaf 132b. The lower the axial extent a of the sloped regions 74, the lower will be the hydrodynamic lift generated, but in the field of gas turbine engines it has been found that a useful level of lift can be generated with sloped regions 74 as short as 0.1w.

The angle which the sloped region 74 makes to rotational axis of the rotor 51 is preferably between 1 and 60 degrees. However, low angles in the region of 1 degree to the rotational axis can give limited benefit in operation because transient conditions and off-design wear of the leaves can cause removal of such a shallow angle of slope. It is considered preferable for the sloped regions 74 to make an angle of approximately 45 degrees to the axis of the rotor 51.

It is to be appreciated that whilst three different configurations for the leaves 132b of the second set are disclosed above, various other configurations are also possible without departing from the scope of the present invention. Three such alternatives are illustrated schematically in FIGS. 11, 12 and 13.

Figure 11:
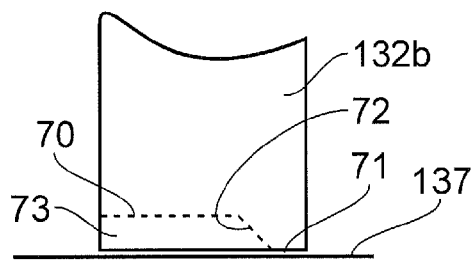
FIG. 11 is a schematic illustration showing an alternative end profile of a leaf.

The alternative configuration for the second set leaves 132b illustrated in FIG. 11 has an end edge region proximate the surface 137 of the rotor 51 which has a stepped profile similar to the configuration of FIGS. 7 and 8, but in which the step 72 is actually sloped rather than being exactly radial as illustrated in FIG. 8. Again, it will be noted that this configuration provides an upstream radial gap between the upstream region of the leaf 132b and the rotor surface 137.

Figure 12:
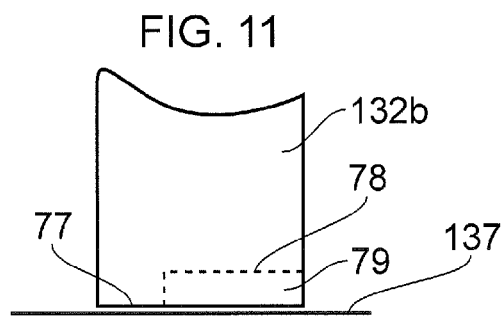
FIG. 12 is a schematic illustration showing another alternative end profile of a leaf.

The alternative arrangement illustrated in FIG. 12 is very similar to the arrangement described above in connection with FIGS. 7 and 8, but in this arrangement the stepped end edge of the second set leaves 132b is reversed so that its upstream region 77 is parallel to and in intimate relationship with the surface 137 of the rotor 51, and its downstream region 78 is spaced radially from the surface 137 of the rotor 51. In this arrangement radial gaps 79 are again defined, except that rather than being open to the upstream (high pressure) side of the leaf pack 50, they are instead open to the downstream (low pressure) side.

Figure 13:
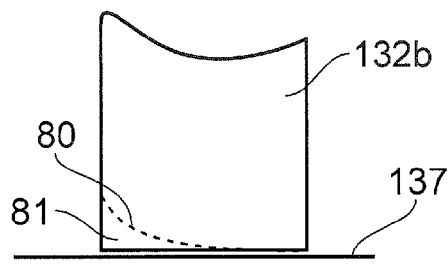
FIG. 13 is a schematic illustration showing a further alternative end profile of a leaf.

The arrangement illustrated in FIG. 13 is configured so that an upstream corner of each leaf 132b of the second set is chamfered (at 80) to define an upstream radial gap 81.

Figure 14:
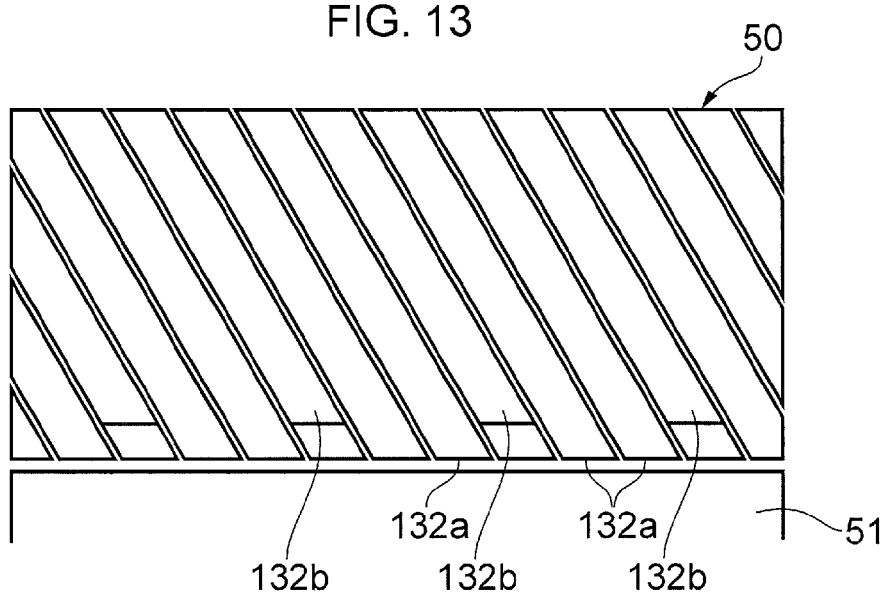
FIG. 14 is a schematic drawing showing part of a leaf seal in accordance with another embodiment, as viewed axially from an upstream side.

It is also to be appreciated that whilst the embodiments described above are all configured such that the leaves 132a, 132b of the first and second sets are provided in equal numbers and in an alternating fashion around the pack 50 such that each leaf 132b of the second set is located between two leaves 132a of the first set, other distributions of leaves are also possible. For example, FIG. 14 illustrates a leaf distribution in which there are more leaves 132a in the first set than there are in the second set 132b. Accordingly, it will be noted that the leaves are arranged such that each leaf 132b of the second set is positioned between successive groups (of two as illustrated) of the first set leaves 132a around the pack. It is also to be noted that the opposite arrangements may also be provided in which there are more leaves 132b in the second set than there are in the first set 132a such that the leaves are then arranged such that each leaf 132a of the first set is positioned between successive groups of the second set leaves 132b around the pack. Furthermore, variants are also envisaged in which the different sets of leaves may be irregularly spaced around the pack, for example in a random or quasi-random distribution.

Turning now to consider FIGS. 15 and 16, another alternative leaf seal arrangement in accordance with the present invention will be described. The most significant difference between this arrangement and the previously described arrangements is that in the arrangement of FIGS. 15 and 16 there are actually two different types of leaves 132b in the second set, the leaves of each type having a different end edge configuration to one another.

Figure 15:
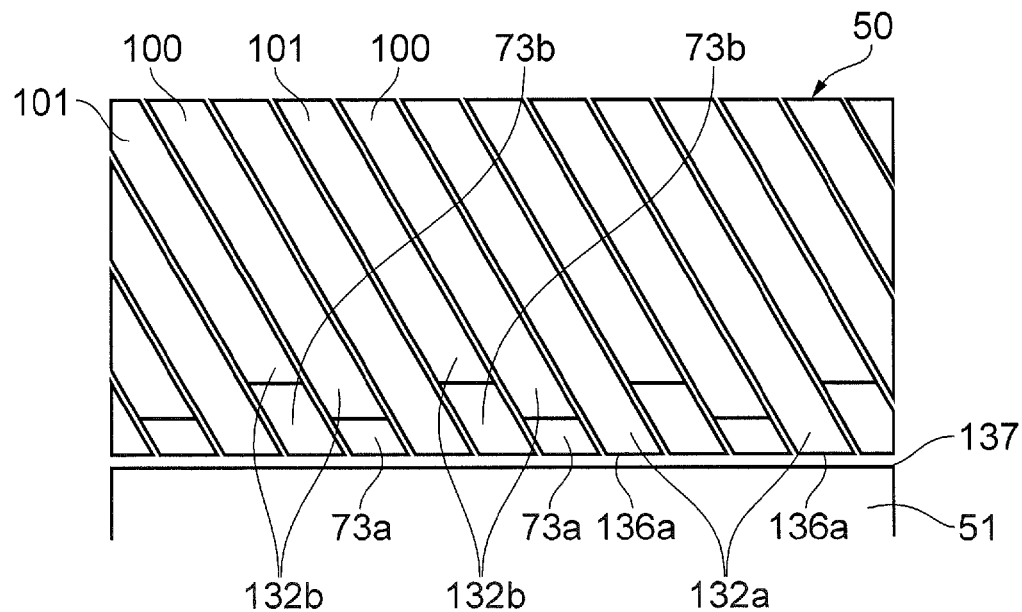
FIG. 15 is a schematic drawing showing part of a leaf seal in accordance with another embodiment, as viewed axially from an upstream side.
Figure 16:
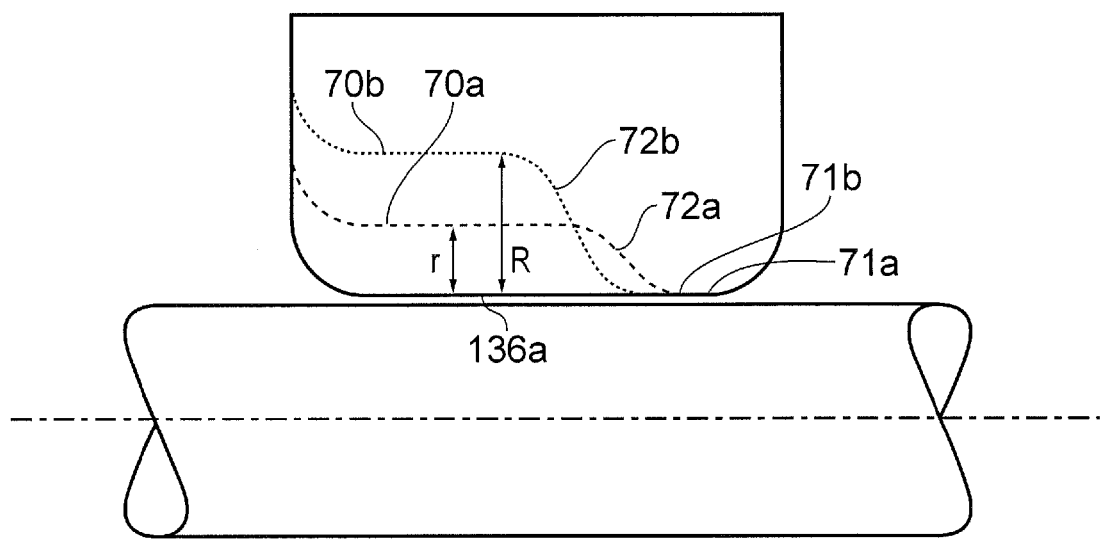
FIG. 16 is a schematic radial cross-sectional view showing the end profiles of leaves of the arrangement of FIG. 15.

In more detail, the arrangement of FIGS. 15 and 16 includes a pack of leaves 50 which has a first set of leaves 132a and a second set of leaves 132b. The leaves 132a of the first set are generally similar to the first set leaves 132a of the previously described embodiments and are hence generally rectangular in form (albeit with slightly chamfered end corners as illustrated in FIG. 16) and arranged circumferentially around the annulus of the pack 50. The leaves 132a of the first set are thus configured to present respective linear end edges 136a into a very close, intimate relationship with the surface 137 of the rotor 51. It is envisaged that when the rotor is stationary and thus not rotating relative to the pack 50, or when the rotor is moving only at low speed relative to the pack 50, the end edges 136a of the first set leaves may lightly touch the surface 137 of the rotor for wiping contact therewith during low-speed rotation.

The leaves 132b of the second set are again circumferentially interspersed throughout the leaves 132a of the first set. However, in this arrangement, the second set of leaves itself actually includes two different types of leaf 100, 101. In the arrangement illustrated, the first type of second set leaves 100 has an end edge profile similar to that illustrated in FIG. 11 and thus comprising an upstream region 70a and a downstream region 71a, separated by a sloping step 72a. The upstream region 70a thus defines a radial gap 73a having a radial dimension r.

The second type of second set leaves 101 have a similar stepped configuration to the first type but are configured such that their upstream regions 70b are shorter in the axial direction and their downstream regions 71b are longer in the axial direction. Furthermore, it will be noted that the second type of second set leaves 101 are configured such that their upstream regions define radial gaps 73b having a larger radial dimension R.

As will thus be appreciated, the arrangement of FIGS. 15 and 16, as a whole, comprises three different configurations of leaf, namely; the first set leaves 132a which are all identical, the first type of second set leaves 101 and the second type of second set leaves 102. The leaves are distributed in a repeating pattern throughout the pack 50, as illustrated in FIG. 15 such that each successive pair of first set leaves 132a are separated by an adjacent pair of second set leaves comprising a leaf of the first type 100 and a leaf of the second type 101.

As can be noted from FIG. 15, circumferential spaces are thus defined between the end edges 136a of successive long leaves 132a of the first set, but in this configuration the circumferential spaces themselves have a stepped profile defined by the two different sizes of radial gaps 73a, 73b. This stepped configuration to the circumferentially arranged spaces between the leaves 132a of the first set is believed to further improve the generation of hydrodynamic lift upon relative rotation between the rotor 51 and the seal pack 50.

Figure 17:
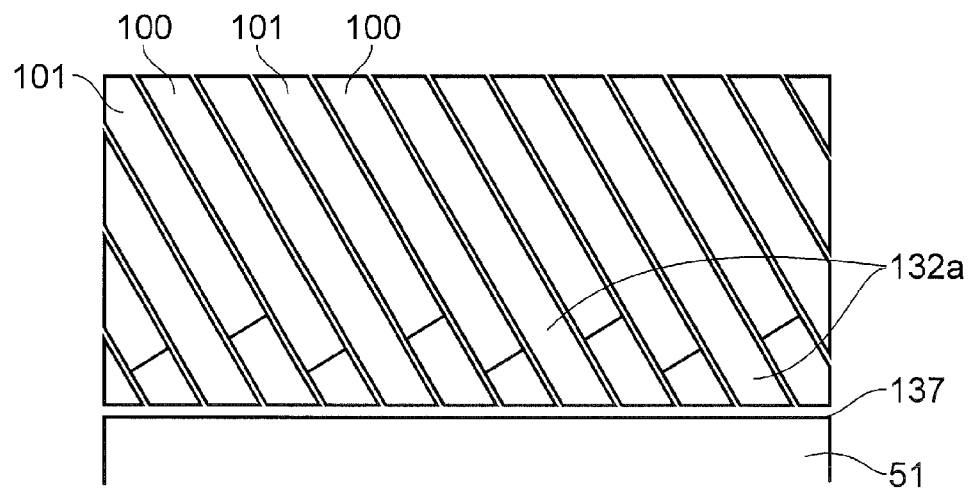
FIG. 17 is a schematic drawing showing part of a leaf seal in accordance with another embodiment, as viewed axially from an upstream side.
Figure 18:
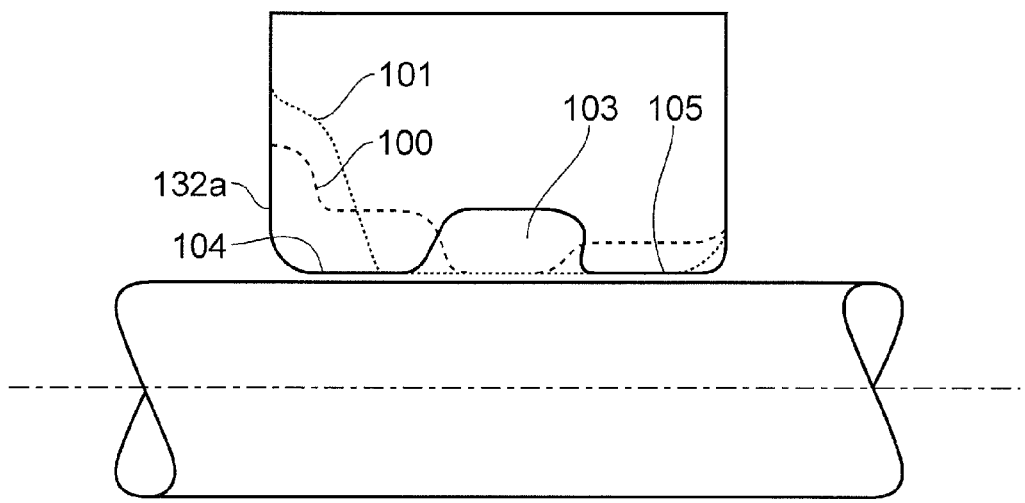
FIG. 18 is a schematic radial cross-sectional view showing the end profiles of leaves of the arrangement of FIG. 17.

Turning now to consider FIGS. 17 and 18 another seal arrangement is illustrated which has second set leaves of two different stepped configurations, the end profiles of which are illustrated respectively in dashed and dotted lines in FIG. 18. Additionally, in this arrangement, the leaves 132a of the first set also have a stepped end profile, as illustrated in solid line in FIG. 18. As will be noted, in this arrangement, the end edge of each leaf 132a of the first set has a centrally located notch removed therefrom so as to define upstream and downstream tabs 104, 105, each of which defines a short edge which is presented into very close, intimate, relationship with the surface 137 of the rotor 51.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A leaf seal for effecting a seal between two coaxial and relatively rotating components, the seal having an annular pack of stacked leaves, the pack being mountable to a first one of the components at root portions of the leaves and extending towards the other component such that end edges of the leaves are presented for air-riding interaction with the other component during relative rotation between the components and, in use, a pressure drop is maintained axially across the pack; wherein the pack comprises a first set of leaves arranged around the pack, each of which is configured to present an end edge at least part of which is in intimate relationship with the other component; and a second set of leaves circumferentially interspersed throughout the first set, the leaves of the first and second sets cooperating to define, around the pack, a plurality of circumferential spaces between the end edges of successive leaves of the first set, said spaces being configured to create a circumferential variation in pressure around the pack which contributes to the generation of hydrodynamic lift between the pack and the other component during relative rotation between the components, wherein each leaf of said second set defines a radial gap between at least a region of its end edge and the other component, said radial gaps defining a radial dimension of said circumferential spaces.

2. A leaf seal according to claim 1, wherein said pack has a high pressure side and a low pressure side across which said pressure drop is maintained in use, at least some of said radial gaps being open to the high pressure side.

3. A leaf seal according to claim 2, wherein at least some of said radial gaps are also open to the low pressure side.

4. A leaf seal according to claim 3, wherein the leaves of said second set are shorter, as measured between their root portions and their end edges, than the leaves of the first set.

5. A leaf seal according to claim 1, wherein said pack has a high pressure side and a low pressure side across which said pressure drop is maintained in use, at least some of said radial gaps being open to the low pressure side.

6. A leaf seal according to claim 1, wherein at least some of the leaves of the second set have an end edge region presenting a stepped axial profile towards the other component.

7. A leaf seal according to claim 1, wherein at least some of the leaves of the second set have an end edge region which presents a sloped axial profile towards the other component.

8. A leaf seal according to claim 1, wherein at least some of the leaves of the second set have an end edge region which presents at least one chamfered corner towards the other component.

9. A leaf seal according to claim 1, wherein the pack includes leaves of different thicknesses to one another.

10. A leaf seal according to claim 1, wherein the leaves of the first and second sets are provided in an alternating fashion around the pack such that each leaf of the second set is located between two leaves of the first set.

11. A leaf seal according to claim 1, wherein the first set of leaves includes more leaves than the second set, the leaves of the second set being arranged between successive groups of first set leaves around the pack.

12. A leaf seal according to claim 1, wherein the second set of leaves includes more leaves than the first set, the leaves of the first set being arranged between successive groups of second set leaves around the pack.

13. A leaf seal according to claim 1, wherein said second set of leaves includes at least two different types of leaves, the leaves of each type having a different end edge configuration to one another.

14. A gas turbine engine having one or more leaf seals according to claim 1.

* * * * *